United States Patent [19]

Kondo

[11] 4,387,343
[45] Jun. 7, 1983

[54] ELECTROOPTIC LIGHT MODULATOR INCLUDING WEIGHTED INTERDIGITAL ELECTRODES

[75] Inventor: Michikazu Kondo, Tokyo, Japan
[73] Assignee: Nippon Electric Co., Ltd., Tokyo, Japan
[21] Appl. No.: 261,081
[22] Filed: May 6, 1981

Related U.S. Application Data

[63] Continuation of Ser. No. 49,863, Jun. 19, 1979, abandoned.

[30] Foreign Application Priority Data

Jun. 22, 1978 [JP] Japan .................................. 53-76026
Jun. 30, 1978 [JP] Japan .................................. 53-80118

[51] Int. Cl.³ .......................... G02F 1/28; G02F 3/00
[52] U.S. Cl. ................................. 332/7.51; 350/374; 350/392; 350/396
[58] Field of Search .................. 332/7.51; 350/96.14, 350/384, 389, 356, 374, 392, 393; 333/204, 133; 310/346, 365, 366

[56] References Cited

U.S. PATENT DOCUMENTS

| | | | |
|---|---|---|---|
| 2,100,836 | 11/1937 | Clothier et al. | 350/392 |
| 2,163,549 | 6/1939 | Clothier et al. | 350/392 |
| 2,163,551 | 6/1939 | Clothier | 350/392 |
| 3,283,264 | 11/1966 | Papadekis | 310/335 |
| 3,575,487 | 4/1971 | Ohm et al. | 350/356 |
| 3,958,862 | 5/1976 | Rylski | 350/392 |
| 4,075,516 | 2/1978 | Nattori et al. | 310/366 |
| 4,175,827 | 11/1979 | McMahon | 350/96.14 |
| 4,197,008 | 4/1980 | Pinnow et al. | 350/374 |

FOREIGN PATENT DOCUMENTS

| | | | |
|---|---|---|---|
| 52-47702 | 2/1977 | Japan | 350/356 |
| 55-4018 | 1/1980 | Japan | 350/392 |
| 525042 | 10/1976 | U.S.S.R. | 332/7.51 |

OTHER PUBLICATIONS

Kondo et al., "Phase-Matched Electro-Optic Light Modulator", 8/31/77, Proc. of the 9th Conf. of Solid State Devices, Tokyo.

*Primary Examiner*—Nelson Moskowitz
*Attorney, Agent, or Firm*—Sughrue, Mion, Zinn, Macpeak and Seas

[57] ABSTRACT

In a light modulator wherein a modulator medium, such as an a-cut lithium tantalate plate, has a Pockels coefficient for converting one of orthogonally polarized components of a light beam to the other thereof in cooperation with an electric field produced in the medium in a direction predetermined relative to the thickness of the medium while the light beam is transmitted between a pair of end surfaces of the medium and wherein a voltage is supplied between that interdigital electrode pair to produce the electric field, digit electrodes of which are distributed along one of a pair of principal surfaces of the medium at a predetermined pitch between the end surfaces, weights are attached to at least those of the digit electrodes which are distributed adjacent to each end surface. Each weight-attached digit electrode contributes to conversion of the polarization to an extent determined by the weight attached thereto. The weights are gradually varied or reduced as the digit electrodes are distributed nearer to each end surface. It is possible to vary the weights by varying those parts of the electric field which are produced in the medium adjacent to the respective digit electrodes, as by varying the voltage supplied between each successive digit electrode pair or by varying the thickness. Alternatively, the weights are varied by varying the ratio of the width of each digit electrode to the gap by which that digit electrode is spaced from a next following digit electrode.

11 Claims, 7 Drawing Figures

ELECTROOPTIC LIGHT MODULATOR INCLUDING WEIGHTED INTERDIGITAL ELECTRODES

This is a continuation of application Ser. No. 49,863 filed June 19, 1979 and now abandoned.

BACKGROUND OF THE INVENTION

This invention relates to a light modulator that comprises an optically anisotropic medium capable of exhibiting an electrooptic effect. Such a light modulator is useful in modulating, among others, the phase, the polarization, and/or the intensity of a laser beam with a modulating signal of a frequency between zero and about 1 GHz.

A light modulator is indispensable in most systems in which a laser beam is used in transmitting, recording, reading out, or displaying an enormous amount of information at a high speed. Examples of such systems are optical communication systems, optical memory systems, laser recording systems, and laser display systems. On modulating a light beam that may not necessarily be a coherent beam, a light modulator makes use of mechanical deformation or vibration, an acoustooptic effect, or an electrooptic effect. Among such light modulators, an electrooptic light modulator has the desirable features of being operable in a wide frequency band, at a high speed, and with a high conversion efficiency.

An electrooptic light modulator comprises a piece of crystal that is transparent to a light beam to be modulated and exhibits an electrooptic effect. The crystal is preferably either a uniaxial or a biaxial crystal. It is possible, as the case may be, to use a bulk of an optical isotropic material that shows optical anisotropy when subjected to pressure and/or the like. In a first type of the electrooptic light modulator, a spatially periodic electric field is applied to the crystal by the modulating signal so as to make the crystal have a phase lattice for subjecting an incident light beam to Bragg diffraction or Raman-Nath diffraction. In a second type, the difference in phase delays between a pair of incident light components polarized in the directions of two principal axes of an optical indicatrix (index spheroid or ellipsoid) of the crystal is electrically controlled by the modulating signal so as to modulate the polarization of the incident light. In a third type, a spatially periodic electric field is distributed along light propagating direction, and an optical indicatrix of the crystal is rotated by the modulating signal so as to convert at least a portion of a linearly polarized component of an incident light beam to a cross-polarized component in an output light beam as will be detailed later with reference to a few figures of the accompanying drawing. A light modulator of the third type may be called a phase-matched electrooptic light modulator because two orthogonally polarized components resulting from the linearly polarized component of the incident beam are matched in phase during propagation through the crystal as will become clear as the description proceeds.

A light modulator of the first type comprises electrodes arranged on a principal surface of the crystal in a predetermined pattern for producing the spatially periodic electric field in the crystal. The electrode pattern gives rise to spurious diffraction. It is difficult to attain a large diffraction angle. It is therefore impossible to achieve a high on-off ratio that corresponds to the extinction ratio to be described in the following.

The crystal for use in a light modulator of the second type should have a large electrooptic constant. Examples are an ammonium dihydrogen phosphate (ADP) crystal, a potassium dihydrogen phosphate (KDP) crystal, and a lithium methatantalate ($LiTaO_3$, usually referred to as lithium tantalate) crystal. The ADP and the KDP crystals are defective in that they diliquescence and require a high modulating voltage. A lithium tantalate crystal does not deliquescence and is operable at a low modulating voltage. A high extinction ratio, however, is not attainable by the use of only one lithium tantalate crystal because the cross-polarized component appears in the output light beam as an unavoidable result of a shift in the ambient temperature from a predetermined temperature even when no modulating voltage is applied to the crystal. The extinction ratio may be raised with a pair of crystals cascade-connected in compensation for the temperature shift. It is, however, difficult with such a composite light modulator to achieve a sufficient temperature stability due to the difficulties in obtaining homogeneous crystals and in manufacturing the composite light modulator with high precision. Furthermore, a restriction is imposed on the wavelength of the incident light.

A phase-matched electrooptic light modulator is operable with a relatively low modulating voltage and provides a high extinction ratio. The conversion efficiency of a sophisticated phase-matched electrooptic light modulator, however, decreases according as the ambient temperature shifts from a predetermined temperature at which the phases of the orthogonally polarized components are matched. This results in a narrow temperature range in which the light modulator is operable. In other words, the temperature at which the light modulator is kept in operation has to be fairly strictly controlled. An improved light modulator of this type is disclosed in Japanese Publication of Unexamined Patent Application (Tokkyo Kokai Koho) No. Syo 54-27455 of 1979 by the present applicant. According to the improvement, the operable temperature range is widened with the difference between two principal indices of refraction substantially continuously varied along the direction of propagation of the light beam being modulated. Although the conversion efficiency is kept high in a wide temperature range, the conversion efficiency still considerably fluctuates within the operable temperature range. Another improved light modulator of this type is revealed, prior to the above-mentioned improvement by the applicant, in Japanese Publication of Unexamined Patent Application No. Syo 53-93856 in 1978 by Yoshinori Ohta, assignor to the instant assignee. This prior improvement is similar to the later improvement as regards the fluctuation of the conversion efficiency. A change in the wavelength of the incident light beam also results in a similar undesirable fluctuation in the conversion efficiency.

SUMMARY OF THE INVENTION

It is therefore an object of the present invention to provide a light modulator of a phase-matched electrooptic type, which has a high conversion efficiency substantially constant over a wide range of temperature.

It is another object of this invention to provide a light modulator of the type described, which has a high and substantially constant conversion efficiency over a wide range of the wavelength of an incident light beam.

According to this invention, there is provided a light modulator comprising (a) a modulator medium having a pair of principal surfaces and a first and a second end surface, capable of transmitting an input light beam incident on the first end surface as a propagating light beam and of making the propagating light beam proceed further out of the medium as an output light beam at the second end surface, and having an electooptic constant for causing rotation of an optical indicatrix of the medium for the propagating light beam when an electric field is produced in the medium substantially in the direction of the distance between the principal surfaces, (b) a pair of interdigital electrodes along one of the principal surfaces with digit electrodes thereof distributed between the end surfaces at a pitch substantially continuously varied from the first end surface to the second end surface, and (c) means for supplying an electric voltage between the interdigital electrodes to produce the electric field in the medium, whereby the input light beam is converted to the output light beam as a result of rotation of the optical indicatrix with an overall conversion efficiency substantially dependent on the electrooptic constant and the electric field. Each digit electrode contributes to the conversion efficiency. The light modulator further comprises (d) means for attaching weights to at least those of the digit electrodes which are distributed adjacent to each end surface. Each weight-attached digit electrode contributes to the conversion efficiency depending on the weight attached thereto and that part of the electric field which is produced in the medium adjacent thereto. The weights are substantially continuously varied according as the weight-attached digit electrodes are distributed nearer to the above-mentioned each end surface.

DESCRIPTION OF THE PREFERRED EMBODIMENTS

Figure 1:
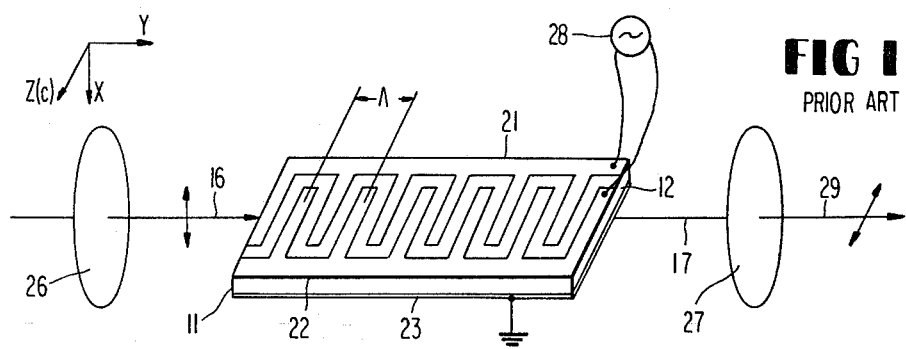
FIG. 1 illustrates a perspective view of a sophisticated phase-matched electrooptic light modulator, together with a polarizer, an analyser, and a signal generator.
Figure 2:
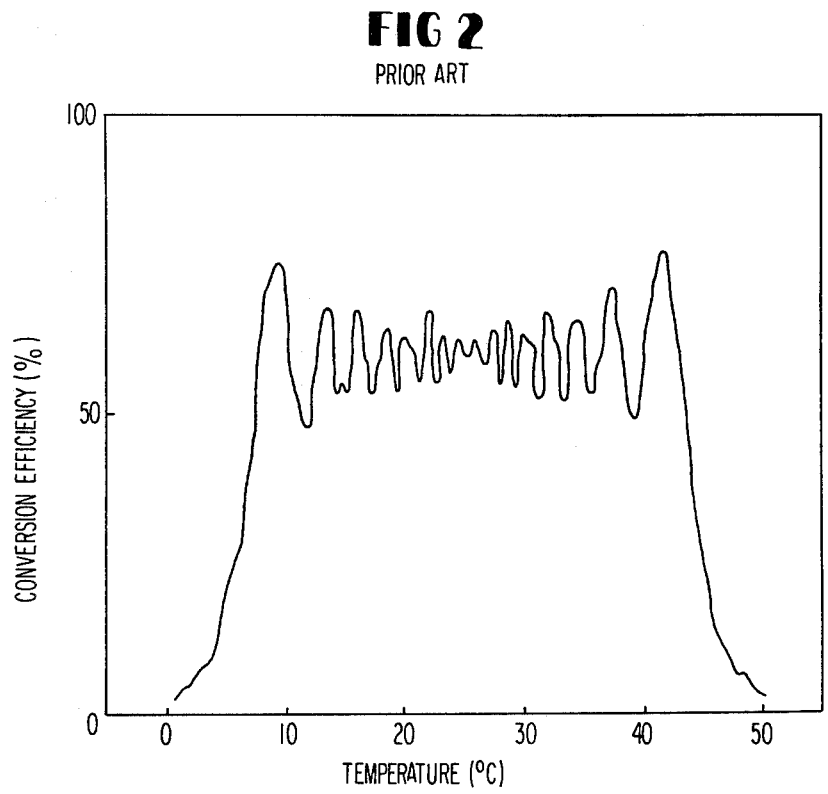
FIG. 2 shows a temperature characteristic of the conversion efficiency of a conventional phase-matched electrooptic light modulator that is a modification of the modulator depicted in FIG. 1.

Referring to FIGS. 1 and 2, a sophisticated phase-matched electrooptic light modulator will be described at first in order to facilitate an understanding of the present invention. The light modulator comprises an electrooptic light modulator medium or plate cut from a lithium tantalate crystal, which is a crystal of the trigonal system. The ratio $Li_2O:Ta_2O_5$ in which lithium oxide and tantalum(V) oxide are compounded may be any of about 0.8 through 1.5 by mol. The crystal plate has a predetermined thickness, a pair of principal surfaces perpendicular to one of the a crystallographic axes, and first and second end surfaces 11 and 12 perpendicular to a straight line bisecting the angle formed between the two other a axes. For convenience of description, the first-mentioned a axis will be deemed to be the X axis of the index spheroid of the crystal and the straight line, the Y axis. An input or incident light beam 16 linearly polarized in the direction of the X axis is directed onto the first end surface 11 so as to be transmitted through the crystal plate along the Y axis and to be produced as an output light beam 17 from the second end surface 12. First and second interdigital electrodes 21 and 22 having digit electrodes parallel to the c or principal crystallographic axis is attached onto one of the principal surfaces. The c axis is the Z axis of the index spheroid. The other principal surface is uniformly covered with an opposing electrode 23 evaporated or otherwise formed thereon. A pitch or period $\Lambda$ of the digit electrodes of each interdigital electrode 21 or 22 is selected so as to approximately satisfy at a predetermined temperature an equation:

$$2\pi/\Lambda = 2\pi |n_e - n_o|/\lambda, \tag{1}$$

where $n_o$ and $n_e$ represent refractive indices for the ordinary and the extraordinary rays and $\lambda$, the wavelength of the input light beam 16 in vacuum. The thickness of the crystal plate is rendered less than the gap between each successive digit electrode pair or at the greatest approximately two times the gap.

In FIG. 1, the light modulator is accompanied by a polarizer 26 for providing the above-mentioned input light beam 16 and an analyser 27 for transmitting a cross-polarized component of the output light beam 17, namely, a component polarized in the direction of the Z axis. The opposing electrode 23 is kept at a reference potential, such as ground. A modulating signal symbolized at a signal generator 28 is supplied between the interdigital electrodes 21 and 22 so as to vary above and below the reference potential. The modulating signal of a finite instantaneous voltage supplies the crystal plate with an electric field having a direction parallel to the X axis and senses or polarities alternatingly reversed periodically along the Y axis. The output light beam 17 becomes an elliptically polarized beam having a component polarized in the direction of the Z axis, which component alone is allowed to pass through the analyser 27 to become a modulated light beam 29. The intensity of the modulated light beam 29 varies with the instantaneous voltage of the modulating signal. At a certain instantaneous voltage, the conversion efficiency reaches 100% as shown in FIG. 2 of the above-mentioned Ohta disclosure. The modulation is possible also for an incident light beam linearly polarized in the direction of the Z axis and for an elliptically polarized beam having orthogonally polarized components in the directions of the X and the Z axes.

More particularly, the modulating signal produces a partial electric field in the direction of the X axis under each digit electrode. The electrooptic constant of the crystal plate is given by a set of tensor components known as Pockels coefficients. One of the Pockels coefficients that is denoted by $r_{51}$ in the art gives rise to rotation of the optical indicatrix in cooperation with the partial electric field. Under the digit electrode contiguous to the first end surface 11, a small part of the incident light beam 16 is converted to a cross-polarized component. The pitch Λ given by Equation (1) is for matching the orthogonally polarized components in phase so that the conversion is carried out additively throughout the digit electrodes of the interdigital electrodes 21 and 22. As a result, a considerable portion of the linearly polarized component in the input light beam 16 is converted to a cross-polarized component in the output light beam 17. The electrodes 21 through 23 and the signal generator 28 thus serve as means actually supplying the modulator medium with an electric field spatially periodically varied along the direction of transmission of the light beam being modulated. At least a portion of a component polarized in the input light beam 16 in a predetermined one of the directions of the X and the Z axes is converted in the output light beam 17 to another component polarized in the other of the directions.

With a light modulator of the type illustrated with reference to FIG. 1, the principal refractive indices and the difference therebetween, namely, the degree of birefringence varies with the ambient temperature. When no voltage is supplied between the interdigital electrodes 21 and 22, no conversion occurs in polarization of the light beam propagating through the modulator medium regardless of the ambient temperature. The extinction ratio is therefore high. With a shift in the ambient temperature from the predetermined temperature, Equation (1) is rendered unsatisfied. This reduces the conversion efficiency as pointed out in the preamble of the instant specification. In a light modulator taught in the Ohta disclosure referred to hereinabove, the pitch Λ is monotonously varied along the Y axis. With this, it is possible to widen the operable temperature range. The conversion efficiency, however, fluctuates as exemplified in FIG. 2 for a light modulator comprising a 20-mm long lithium tantalate crystal plate having a difference of $3.164 \times 10^{-3}$ at 25° C. between the principal refractive indices and the interdigital electrode pitch Λ varied between 156 microns and 284 microns with the ratio of the width of each digit electrode to the next following gap kept constant and with an electric field of 80 volts per 100 microns produced in the crystal plate. The operable temperature range is from about 10° C. to about 40° C. The conversion efficiency, however, fluctuates about 30%.

Figure 3:
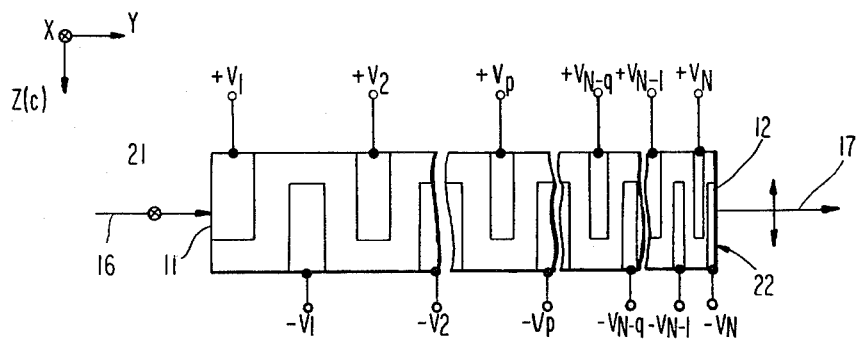
FIG. 3 is a schematic top view of a phase-matched electrooptic light modulator according to a first embodiment of the present invention.

Referring now to FIG. 3, a phase-matched electooptic light modulator according to a first embodiment of this invention comprises a lithium tantalate crystal plate of the material, the orientation, and the shape described in conjunction with the light modulator illustrated with reference to FIG. 1. Similar parts and signals are designated by like reference numerals. It is to be noted that the pitch Λ is gradually or substantially continuously varied as suggested in the above-referenced Ohta disclosure. An example of the gradual variation is a monotonous variation defined by:

$$2\pi/\Lambda = 2\pi |n_e - n_o|(1+ky)/\lambda, \quad (2)$$

where k represents a constant (either positive or negative) and $-L/2 \leq y \leq +L/2$, L being representative of the total length of the crystal plate in the direction of the Y axis. It should also be noted that the first and the second interdigital electrodes 21 and 22, although so named, consist of individual digit electrodes at least near the first and the second end surfaces 11 and 12. In the example being illustrated, the digit electrodes of each interdigital electrode 21 or 22 are N in number. The digit electrodes of the first interdigital electrode 21 are individually supplied with voltages $+V_1, +V_2, \ldots, +V_p, \ldots, +V_{N-q}, \ldots, +V_{N-1}$, and $+V_N$. Those of the second interdigital electrodes 22 are supplied with voltages $-V_1, -V_2, \ldots, -V_p, \ldots, -V_{N-q}, \ldots, -V_{N-1}$, and $-V_N$, respectively. The applied voltages are varied according to:

$$V_1 < V_2 < \ldots < V_p,$$

$$V_p = \ldots = V_{N-q},$$

and $$V_{N-q} > \ldots > V_{N-1} > V_N,$$

so that the partial electric field produced between each digit electrode and the opposing electrode 23 may become weaker according as that digit electrode is placed nearer to the end surface 21 or 22. This tapered voltage set is readily derived from the modulating signal voltage by applying the modulating signal between the interdigital electrodes 21 and 22 through means for gradually reducing the voltage, such as resistors and/or capacitors (not shown).

Figure 4:
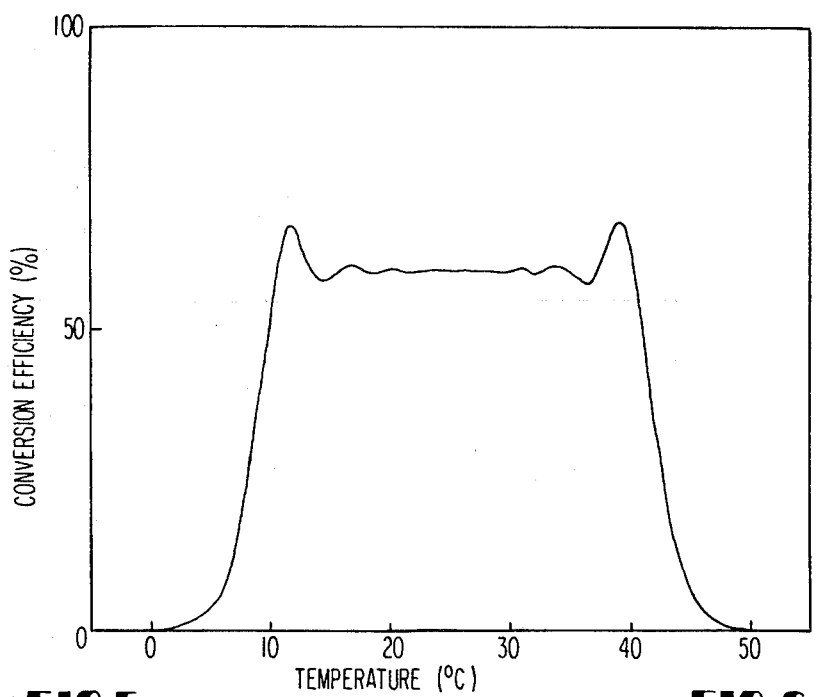
FIG. 4 diagrammatically shows a temperature characteristic of the conversion efficiency of an example of light modulators of the type depicted in FIG. 3.

Referring to FIG. 4, it has now been found and confirmed that the above-described fluctuation in the temperature characteristic of the conversion efficiency results from the finite crystal length and the finite number of digit electrodes and that it is possible to suppress the fluctuation with a light modulator illustrated with reference to FIG. 3. More specifically, the temperature characteristic exemplified in FIG. 4 was obtained by the use of the dimensions of the crystal plate and the pitch, the width, and the number of digit electrodes rendered equal to those used in depicting FIG. 2 except that the voltage applied to the digit electrodes placed between each end surface 11 or 12 and a line inwardly spaced 2.4 mm from that end surface is reduced approximately along the sine curve between zero and $\pi/2$. As described, the temperature stability means the stability for the wavelengths of the incident light beam 16.

Figure 5:
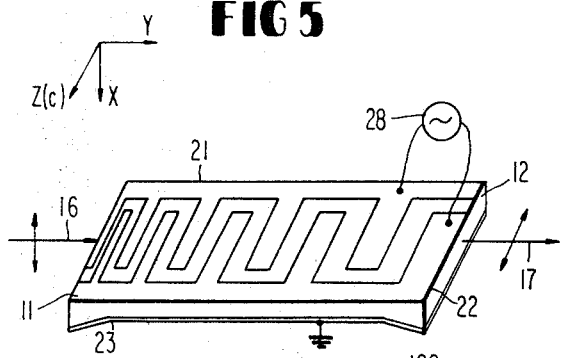
FIG. 5 schematically illustrates a perspective view of a phase-matched electrooptic light modulator according to a second embodiment of this invention, together with a signal generator.

Referring to FIG. 5, a light modulator according to a second embodiment of this invention comprises a lithium tantalate crystal plate of the material, the orientation, and the shape described in conjunction with FIGS. 1 and 3 except that the thickness is increased near and towards the end surfaces 11 and 12. The interdigital electrodes 21 and 22 are distributed between the end surfaces 11 and 12 as described in connection with FIG. 3 rather than as in FIG. 1. Due to the increased thickness, the partial electric field becomes weaker near and towards the respective end surfaces 11 and 12 despite absence of the voltage reducing means. The illustrated light modulator is as stable against variation in the ambient temperature and change in the wavelengths of the input light beam 16 as exemplified with reference to FIG. 4.

Figure 6:
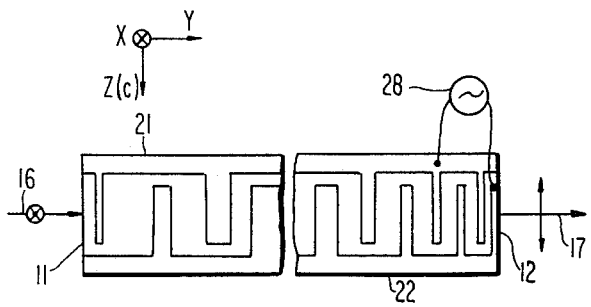
FIG. 6 shows a schematic top view of a phase-matched electrooptic light modulator according to a third embodiment of this invention, together with a signal generator.

Turning to FIG. 6, a phase-matched electrooptic light modulator according to a third embodiment of this invention again comprises a lithium tantalate crystal plate of the material, the orientation, and the shape described in conjunction with FIGS. 1 and 3. Similar parts and signals are designated by like reference numerals. The pitch Λ is again tapered according to Equation (2). Merely for simplicity of description, the total number of digit electrodes of the first and the second interdigital electrodes 21 and 22 will be denoted by N. The i-th digit electrode (i=1, 2, ..., and N) has a width $W_i$ in the direction of the Y axis and is spaced from the next following (i+1)-th digit electrode by a gap $S_i$. Ratios $R_i$ of the widths $W_I$ to the respective gaps $S_i$ are varied according to:

$$R_1 < R_2 < \ldots < R_p,$$

$$R_p = \ldots = R_{N-q},$$

and $$R_{N-q} > \ldots > R_{N-1} > R_N,$$

so that the width $W_i$ in which the partial electric field is applied relative to the opposing electrode 23 decreases towards the end surfaces 11 and 12.

Figure 7:
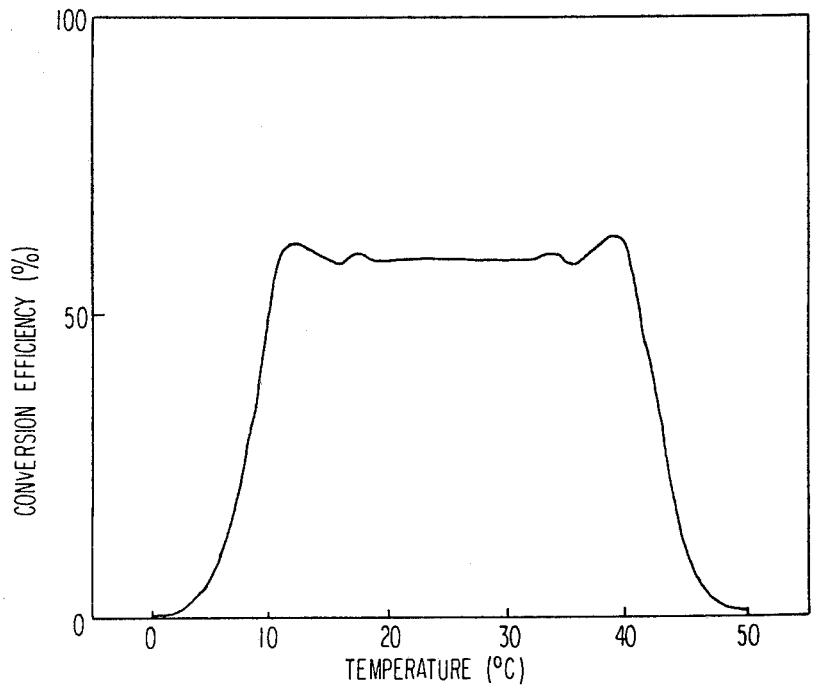
FIG. 7 diagrammatically shows a temperature characteristic of the conversion efficiency of an example of light modulators of the type depicted in FIG. 6.

Referring to FIG. 7, suppression of the fluctuation in the temperature characteristic of the conversion efficiency is better than that exemplified in FIG. 4. The curve shown in FIG. 7 is for a light modulator similar to that used in depicting FIG. 4 except that the variation of the ratios $R_I$ is adopted to the digit electrodes distributed between each end surface 11 or 12 and a line inwardly spaced 2.4 mm from that end surface with the ratios $R_i$ varied approximately along the sine curve between zero and $\pi/2$.

Reviewing FIGS. 3, 5, and 6, it is now understood that this invention resides in giving or attaching different weights at least to the digit electrodes distributed near the end surfaces 11 and 12 so as to gradually or substantially continuously vary the conversion efficiency towards the respective end surfaces 11 and 12. For temperature stability, the weights are preferably reduced towards each end surface 11 or 12 either linearly or monotonously elliptically, in the sine square fashion, or in any of other manners. For a desired characteristic as regards the wavelengths of the incident light beam 16, the weights are varied according to a suitable function that may not necessarily monotonously vary. As the modulator medium, it is possible to use any plate-shaped medium that has a thickness and an electrooptic constant capable of causing rotation of an optical indicatrix of the medium when an electric field is produced in the medium in the direction of the thickness. Typical medium is a lithium tantalate crystal described hereinabove, a mixed crystal of lithium tantalate and lithium niobate (or more precisely, methaniobate), a barium methatitanate ($BaTiO_3$, generally known as barium titanate) crystal, and a crystal of $Ba_2NaNb_5O_{15}$. An ADP or a KDP crystal is applicable as well, provided that the electric field is applied along the light path.

It is also possible to use a plate that is cut from a crystal of the trigonal system so as to have principal surfaces perpendicular to the above-named Y axis. In this event, the Pockels coefficient that contributes to rotation of the index spheroid is that generally denoted by $r_{42}$. A Wollaston's prism or the like may be substituted for the analyser 27. At any rate, the polarizer 26 and/or the analyser 27 are immaterial to a light modulator. A thin modulator medium is preferred in reducing the modulating voltage and raising the conversion efficiency. Mechanical grinding and polishing is usually resorted to. A modulator medium thinner than about a few scores of microns behaves as a thin-film optical guide. Such a thin modulator medium is manufactured by resorting to the crystal growth techniques. Evaporation or sputtering of an optically anisotropic medium onto a substrate is also possible. Another typical technique is to diffuse a metal into a crystal plate to form a metal-diffused surface layer for transmitting the propagating light beam. Under the circumstances, it is possible to produce the electric field by merely applying the modulating signal between the interdigital electrodes 21 and 22 without the use of the opposing electrode 23. In such a thin modulator medium, the light beam propagates in a plurality of modes. The modulator should therefore be designed for a particular one of the modes. It is also possible to apply the teaching of Publication No. Syo 54-27455 cited hereinabove to a modulator medium for use in a light modulator according to this invention. Needless to say, the modulator can be formed as a portion of an optical integrated circuits, then at least one of end surfaces cannot be disposed on air.

In the foregoing description of the third embodiment, both the pitch Λ and ratios $R_i$ are varied, but it is possible to keep the pitch Λ constant so long as the conversion efficiency can be varied by means of changing the ratio $R_i$.

I claim:

1. A light modulator comprising:
a modulator medium having a pair of principal surfaces and a first and a second end surface, capable of transmitting an input light beam incident on said first end surface as a propagating light beam and of making said propagating light beam proceed further out of said medium as an output light beam at said second end surface, and having an electrooptic constant for causing rotation of an optical indicatrix of said medium for said propagating light beam when an electric field is produced in said medium substantially in a direction predetermined relative to the distance between said principal surfaces;
a pair of interdigital electrodes along one of said principal surfaces with digit electrodes thereof distributed between said end surfaces at a pitch substantially continuously varied from said first end surface to said second end surface;
means for applying an electric voltage between said interdigital electrodes to produce said electric field in said medium, whereby said input light beam is converted to said output light beam as a result of rotation of said optical indicatrix with an overall conversion efficiency substantially dependent on said electrooptic constant and said electric field, each digit electrode contributing to said conversion efficiency; and
means for attaching weights to at least those of said digit electrodes which are distributed adjacent to each end surface, each weight-attached digit electrode contributing to said conversion efficiency depending on the weight attached thereto and that part of said electric field which is produced in said medium adjacent thereto, said weights being substantially continuously varied according as said weight-attached digit electrodes are distributed nearer to said each end surface.

2. A light modulator as claimed in claim 1, wherein said weight attaching means comprises means for substantially continuously varying the electric field parts produced in said medium adjacent to the respective ones of said weight-attached digit electrodes according as said weight-attached digit electrodes are distributed nearer to said each end surface.

3. A light modulator as claimed in claim 2, wherein said weight varying means comprises means operatively coupled to said voltage supplying means for substantially continuously varying the voltage supplied between each adjacent pair of said weight-attached digit electrodes according as said weight-attached digit electrodes are distributed nearer to said each end surface.

4. A light modulator as claimed in claim 2, wherein said weight varying means is implemented by continuously varying the distance between those areas of said principal surfaces along which said weight-attached digit electrodes are distributed on said one principal surface.

5. A light modulator as claimed in claim 1, each digit electrode having a width along the direction of transmission of said propagating light beam and spaced by a gap from the digit electrode next following said each digit electrode in the direction from either of said end surfaces to the other thereof, wherein said weight attaching means is implemented by substantially continuously varying the ratio of said width to said gap according as said weight-attached digit electrodes are distributed nearer to said each end surface.

6. A light modulator as claimed in claims 1, 2, 3, 4, or 5, wherein said weights are monotonously reduced according as said weight-attached digit electrodes are distributed nearer to said each end surface.

7. A light modulator comprising:
a modulator medium having a pair of principal surfaces and a first and a second end surface, capable of transmitting an input light beam incident on said first end surface as a propagating light beam to make said propagating light beam exit said medium at said second end surface, and having an electrooptic constant for converting at least a portion of one of orthogonally polarized components of said propagating light beam to the other thereof when an electric field is produced in said medium;
a pair of interdigital electrodes along one of said principal surfaces with digit electrodes thereof periodically distributed between said end surfaces, each digit electrode having a width along the direction of transmission of said propagating light beam and spaced by a gap from the digit electrode next following said each digit electrode in the direction from either of said end surfaces to the other thereof; and
means for supplying an electric voltage between said interdigital electrodes to produce said electric field in said medium;
the ratio of said width to said gap being substantially continuously varied at least for each of predetermined successive ones of said digit electrodes.

8. A light modulator as claimed in claim 7, wherein said predetermined successive digit electrodes are those of said digit electrodes which are distributed adjacent to each end surface and the ratios are successively reduced according as said successive digit electrodes are distributed nearer to said each end surface.

9. A light modulator comprising: a modulator medium having a first and a second region, capable of transmitting an input light beam incident on said first region as a propagating light beam to make said propagating light beam exit said medium at said second region as an output light beam, and having an electrooptic constant for converting at least a portion of one of orthoganally polarized components of said propagating light beam to the other thereof when an electric field is produced in said medium; and
means for producing those partial electric fields having respective peak values in said medium which are periodic in the direction of transmission of said propagating light beam, each of said partial electric fields serving as the first-mentioned electric field, the partial electric fields produced in said medium adjacent to said first and second regions having peak values smaller than those produced in said medium at a central portion and substantially continuously reduced in the directions towards said first and second regions.

10. A light modulator comprising:
a modulator medium having a pair of principal surfaces and a first and a second end surface, capable of transmitting an input light beam incident on said first end surface as a propagating light beam and of making said propagating light beam proceed further out of said medium as an output light beam at said second end surface, and having an electrooptic constant for causing rotation of an optical indicatrix of said medium for said propagating light beam when an electric field is produced in said medium substantially in a direction predetermined relative to the distance between said principal surfaces;
a pair of interdigital electrodes along one of said principal surfaces with digit electrodes thereof distributed between said end surfaces at a pitch substantially continuously varied from said first end surface to said second end surface;
means for supplying an electric voltage between said interdigital electrodes to produce said electric field in said medium, whereby said input light beam is converted to said output light beam as a result of rotation of said optical indicatrix with an overall conversion efficiency substantially dependent on said electrooptic constant and said electric field, each digit electrode contributing to said conversion efficiency;
means for attaching weights to at least those of said digit electrodes which are distributed adjacent to each end surface, each weight-attached digit electrode contributing to said conversion efficiency depending on the weight attached thereto and that part of said electric field which is produced in said medium adjacent thereto, said weights being substantially continuously varied according as said weight-attached digit electrodes are distributed nearer to said each end surface; and
said electrodes being weighted to provide a decreasing electric field effect on the light beam passing through said medium, said electric field effect decreasing at least in the vicinity of and in a direction towards both said ends.

11. A light modulator comprising: a modulator medium having a first and a second end surface, capable of transmitting an input light beam incident on said first end surface as a propagating light beam to make said propagating light beam exit said medium at said second end surface as an output light beam, and having an electrooptic constant for converting at least a portion of one of orthogonally polarized components of said propagating light beam to the other thereof when an electric field is produced in said medium; and
means for producing partial electric fields having respective peak values in said medium which are periodic in the direction of transmission of said propagating light beam, each of said partial electric fields serving as the first-mentioned electric field, the partial electric fields produced in said medium adjacent to each end surface having peak values smaller than those produced in said medium at a central portion and substantially continuously reduced in the directions towards said end surfaces.

* * * * *

UNITED STATES PATENT AND TRADEMARK OFFICE
CERTIFICATE OF CORRECTION

PATENT NO. : 4,387,343
DATED : June 7, 1983
INVENTOR(S) : Michikazu Kondo

It is certified that error appears in the above-identified patent and that said Letters Patent is hereby corrected as shown below:

Column 8, line 45, change "applying" to --supplying--.

Signed and Sealed this

Nineteenth Day of March 1985

[SEAL]

Attest:

DONALD J. QUIGG

Attesting Officer

Acting Commissioner of Patents and Trademarks